United States Patent
Payonk et al.

(10) Patent No.: US 11,327,944 B1
(45) Date of Patent: May 10, 2022

(54) STORING AND RETRIEVING DATA IN DATA STORES

(71) Applicant: Village Practice Management Company, LLC, Chicago, IL (US)

(72) Inventors: Dennis Payonk, Chicago, IL (US); Mario Urquizo, Jr., Palos Heights, IL (US); Michael Roberts, Elmhurst, IL (US); Nicholaus J. Bauer, Joliet, IL (US)

(73) Assignee: Village Practice Management Company, LLC, Chicago, IL (US)

( * ) Notice: Subject to any disclaimer, the term of this patent is extended or adjusted under 35 U.S.C. 154(b) by 270 days.

(21) Appl. No.: 16/689,958

(22) Filed: Nov. 20, 2019

(51) Int. Cl.
*G06F 16/23* (2019.01)
*G06F 16/22* (2019.01)

(52) U.S. Cl.
CPC .......... *G06F 16/23* (2019.01); *G06F 16/2282* (2019.01)

(58) Field of Classification Search
CPC ............................ G06F 16/23; G06F 16/2282
See application file for complete search history.

(56) References Cited

U.S. PATENT DOCUMENTS

| | | | | |
|---|---|---|---|---|
| 2019/0384836 A1* | 12/2019 | Roth | .................. | G06F 16/9024 |
| 2020/0104377 A1* | 4/2020 | Earnesty, Jr. | ......... | G06F 9/4843 |
| 2020/0274900 A1* | 8/2020 | Vaishnavi | ........... | H04L 63/0815 |
| 2020/0320059 A1* | 10/2020 | Kumar | ................ | G06F 16/2379 |
| 2020/0394225 A1* | 12/2020 | Nair | .................. | G06F 16/90335 |
| 2021/0149854 A1* | 5/2021 | Barde | .................. | H04L 63/126 |

* cited by examiner

*Primary Examiner* — Richard L Bowen
(74) *Attorney, Agent, or Firm* — McDermott Will & Emery LLP

(57) ABSTRACT

Methods and systems for improving data store performance are provided. In one aspect, a method includes creating a target data definition for a target fact table; determining a source data definition of a source table; receiving at least one source record of the source table; mapping, in response to determining the source attributes of the at least one source record include at least one source attribute that corresponds to the at least one target attribute, the at least one source attribute to the at least one target attribute of the target record; and processing, in response to determining the source attributes of the at least one source record include at least one unmapped source attribute that does not correspond to the at least one target attribute, the at least one unmapped source attribute into an unmapped attributes store of the aggregate attribute.

17 Claims, 6 Drawing Sheets

STORING AND RETRIEVING DATA IN DATA STORES

TECHNICAL FIELD

The present disclosure generally relates to data store management, and more specifically relates to systems and methods for storing and retrieving data in data stores.

BACKGROUND

Some traditional data storage and query models for analytical purposes create a physical storage model that has explicit table and attribute definitions against which users submit queries. For example, relational data models require that the definitions and subsequent data for those tables and columns be defined initially and modified subsequently while requiring modifications to physical data storage mechanisms by a data store administrator. Such an architectural model results in a strict schema and requires significant resources to change and add attributes. From a performance standpoint, records are physically stored together such that columnar-oriented analytical querying performance lacks the speed necessary to query larger datasets.

In efforts to address such speed concerns, column-oriented data stores have been developed to enable fast calculation of metrics (i.e., count, sum, etc.) of individual attributes. These data stores create logical fact tables with predefined attributes. The attributes are stored in columns with pointers to the original record. To address the performance challenge above, the attribute data is physically stored together. By storing attribute values together, the data generally has lower cardinality, can be highly compressed, and are space efficient. While this can make analytical querying faster, it still suffers from the same slow schema change modification process. Additional elements and the change history that are eventually needed as projects evolve for analysis are not available and have to modeled separately. The result is that it requires human intervention to "define," "recompile," and "backfill" additional elements to allow for access by analysts.

Moreover, a more recent category of data stores, for example "NoSQL" data stores, have emerged that remove the process of defining columns when modeling. The data store generally makes application delivery faster, but is challenged when trying to do set based operations. Further, subsequent ability to query the set for analysis is often difficult and can present reliability issues. Such data stores also lack a way to predefine attributes for base level analysis.

The description provided in the background section should not be assumed to be prior art merely because it is mentioned in or associated with the background section. The background section may include information that describes one or more aspects of the subject technology.

SUMMARY

The disclosed methods and systems provide for improving data store performance. For example, the disclosed methods and systems address the challenges of exposing predefined attributes of a fact table while enabling additional, unmanaged attributes to be retrieved at query time. As such, the additional attributes are still available for fast, space efficient retrieval for analytical querying without changing the underlying data storage mechanism or requiring manual schema changes. The disclosed methods and systems provide the methodology of expressing a managed schema including base attributes, and provides the availability of unmanaged attributes to be read at runtime in a manner that is loss-less for analytical purposes while still providing space efficiency for faster column oriented (i.e., attributes) calculations.

According to certain aspects of the present disclosure, a computer-implemented method is described that includes creating a target data definition for a target fact table in a target data store. The target data definition includes at least one target attribute and an aggregate attribute, which represents a storage unit of a target record that stores the change history of the target record and unmapped attributes from a source table that do not correspond with the at least one target attribute. Accordingly, the at least one target attribute and the aggregate attribute represent the target record of the target fact table. The computer-implemented method also includes determining a source data definition of a source table in a source data store. The source data definition includes source attributes. The computer-implemented method also includes receiving at least one source record of the source table. The at least one source record includes the source attributes. The computer-implemented method also includes mapping, in response to determining the source attributes of the at least one source record include at least one source attribute that corresponds to the at least one target attribute, the at least one source attribute to the at least one target attribute of the target record. The computer-implemented method also includes processing, in response to determining the source attributes of the at least one source record include at least one unmapped source attribute that does not correspond to the at least one target attribute, the at least one unmapped source attribute into an unmapped attributes store of the aggregate attribute of the target record.

According to certain aspects of the present disclosure, a system is provided that includes a memory including instructions and one or more processors configured to execute the instructions to create, at a target server, a target data definition for a target fact table in a target data store. The target data definition includes at least one target attribute and an aggregate attribute. The at least one target attribute and the aggregate attribute represent a target record of the target fact table. The one or more processors also execute instructions to determine, at the target server, a source data definition of a source table in a source data store. The source data definition includes source attributes. The one or more processors also execute instructions to receive, at the target server from a source server, at least one source record of the source table. The at least one source record includes the source attributes. The one or more processors also execute instructions to map, by the target server in response to determining the source attributes of the at least one source record include at least one source attribute that corresponds to the at least one target attribute, the at least one source attribute to the at least one target attribute of the target record. The one or more processors also execute instructions to process, by the target server in response to determining the source attributes of the at least one source record include at least one unmapped source attribute that does not correspond to the at least one target attribute, the at least one unmapped source attribute into an unmapped attributes store of the aggregate attribute of the target record. The one or more processors also execute instructions to receive, at the target server, at least one updated source record associated with the at least one source record. The at least one updated source record includes one of updated source data, updated unmapped source data, and updated source data and updated unmapped source data. The one or more processors also execute instructions to update, at the target server, the target record corresponding to the at least one updated source record with one of the updated source data, the updated unmapped source data, and the updated source data and the updated unmapped source data.

In yet another aspect, a non-transitory machine-readable storage medium comprising machine-readable instructions for causing one or more processors to execute a method. The non-transitory machine-readable storage medium includes creating, at a target server, a target data definition for a target fact table in a target data store on the target server. The target data definition includes at least one target attribute and an aggregate attribute. The at least one target attribute and the aggregate attribute represent a target record of the target fact table. The non-transitory machine-readable storage medium also includes determining, at the target server, a source data definition of a source table in a source data store. The source data definition includes source attributes. The non-transitory machine-readable storage medium also includes receiving, at the target server from a source server, at least one source record of the source table on the source server. The at least one source record comprising the source attributes. The non-transitory machine-readable storage medium also includes mapping, by the target server in response to determining the source attributes of the at least one source record include at least one source attribute that corresponds to the at least one target attribute, the at least one source attribute to the at least one target attribute of the target record. The non-transitory machine-readable storage medium also includes processing, by the target server in response to determining the source attributes of the at least one source record include at least one unmapped source attribute that does not correspond to the at least one target attribute, the at least one unmapped source attribute into an unmapped attributes store of the aggregate attribute of the target record.

In yet another aspect, a system is described that includes a means for creating a target data definition for a target fact table in a target data store. The means for creating the target data definition also includes determining a source data definition of a source table in a source data store. The means for creating the target data definition also includes receiving at least one source record of the source table. The means for creating the target data definition also includes mapping, in response to determining the source attributes of the at least one source record include at least one source attribute that corresponds to the at least one target attribute, the at least one source attribute to the at least one target attribute of the target record. The means for creating the target data definition also includes processing, in response to determining the source attributes of the at least one source record include at least one unmapped source attribute that does not correspond to the at least one target attribute, the at least one unmapped source attribute into an unmapped attributes store of the aggregate attribute of the target record. The system also includes a means for transmitting the at least one source record.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and, together with the description, serve to explain the principles of the disclosed embodiments. In the drawings.

Figure 1:
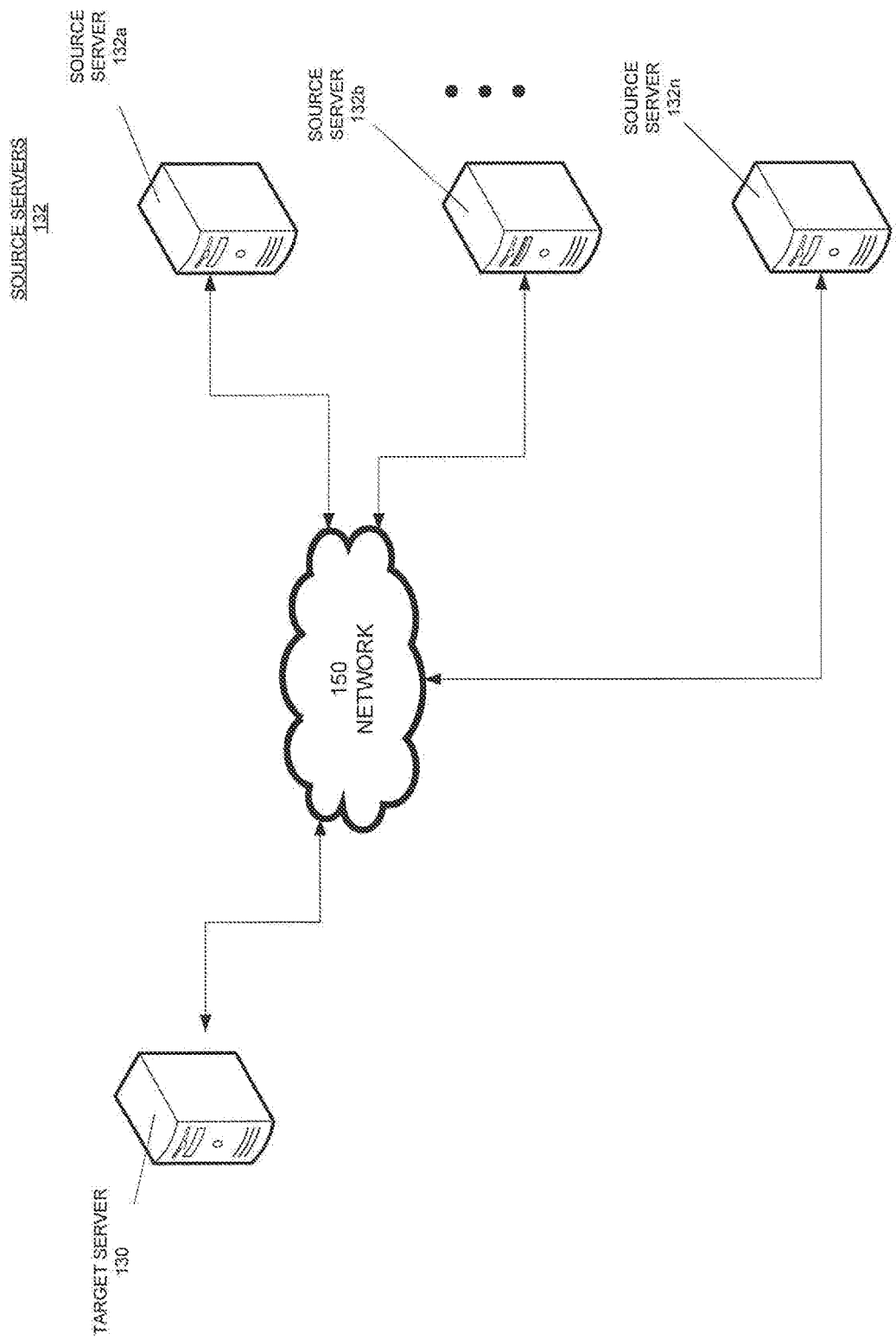
FIG. 1 illustrates an example architecture for storing and retrieving data in data stores.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art will realize, the described implementations may be modified in various different ways, all without departing from the scope of the present disclosure. Accordingly, the drawings and description are to be regarded as illustrative in nature and not restrictive.

General Overview

The disclosed system provides for storing data in a data store in such a manner that a physical record and the history associated with the physical record are co-located in one physical memory location. With the physical record and the history being co-located, they are highly compressible and are available for high performance retrieval, such as, latency optimized retrieval (i.e., easily and quickly accessible for retrieval). Moreover, the disclosed system provides for populating a target fact table with data from a source table in which the schema of the target fact table does not match the schema of the source table. For example, the disclosed system can store all the source attributes that do not match the schema of the target fact table into the same physical memory location as the history associated with the physical record such that all the data in that physical memory can be highly compressed and available for high performance retrieval, such as, latency optimized retrieval.

The disclosed system addresses a technical problem tied to computer technology and arising in the realm of computer networks, namely the technical problem of inefficient use of memory and slow data retrieval rates. The disclosed system addresses this technical problem by providing the practical application of updating a target fact table with data from a source table in such a way that the physical record and the history associated with the physical record are co-located in one physical memory location in the target fact table. By storing the data in this manner, the disclosed system improves memory efficiency as the data is highly compressible and quickly accessible.

The principles of the present disclosure contemplate various types of organizations. For example, corporations and governmental entities (e.g., administrative or military) are all considered within the scope of the present disclosure. The exemplary corporations and governmental entities may be associated with the healthcare industry and the like.

Although certain examples, such as in the healthcare industry, provided herein may describe a patient's information being stored in memory, in certain aspects, each patient must grant explicit permission for such patient information to be stored. The explicit permission may be granted using privacy controls integrated into the disclosed system. If requested patient information includes demographic information, then the demographic information is aggregated on a group basis and not by an individual patient. Each patient is provided notice that such patient information will be stored with such explicit consent, and each patient may, at any time, end having the patient information stored, and may delete the stored patient information. The stored patient information may be encrypted to protect patient security.

The patient can at any time delete the patient information from memory and/or opt out of having the patient information stored in memory. Additionally, the patient can, at any time, adjust appropriate privacy settings to selectively limit the types of patient information stored in memory, or select the memory in which the patient information is stored (e.g., locally on the patient's device as opposed to remotely on a server). In many examples, the patient information does not include and/or share the specific identification of the patient (e.g., the patient's name) unless otherwise specifically provided or directed by the patient.

Example System Architecture

FIG. 1 illustrates an example architecture 100 for storing and retrieving data in data stores. The architecture 100 includes a target server 130 and at least one source server 132 connected over a network 150. Although the target server 130 and the at least one source server 132 are exemplarily illustrated as separate servers, in certain aspects, the target server 130 and the at least one source server 132 can be combined as one server.

Figure 2:
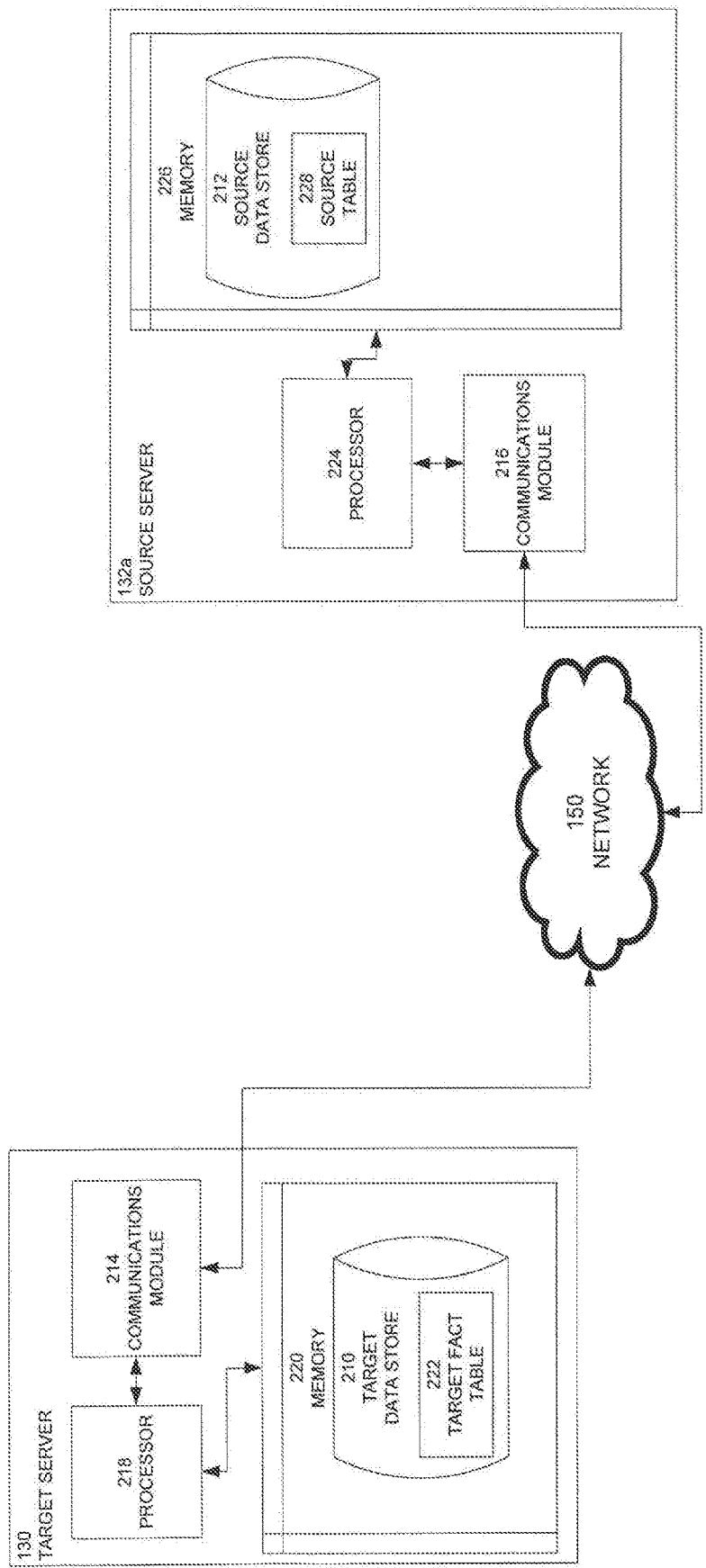
FIG. 2 is a block diagram illustrating example servers from the architecture of FIG. 1 according to certain aspects of the disclosure.

The target server 130 is configured to host a target data store 210 (see FIG. 2). For purposes of load balancing, a plurality of target servers 130 may host the target data store 210. The target server 130 may be any device comprising an appropriate processor, memory, and communications capability for hosting the target data store 210.

The source server(s) 132, including source servers 132a, 132b, . . . 132n, are connected to the target server 130 over the network 150. Each of the source servers 132a, 132b, . . . 132n is configured to host its own source data store 212 (see FIG. 2). Each of the source servers 132a, 132b, . . . 132n may be a separate server associated with a distinct entity, such as, for example, a business-type organization, a physician office, a hospital, and the like. In certain aspects, an entity can be associated with one or more source servers 132 such that each server may be associated with the same schema or may be associated with distinct schema. It should be noted that, in some aspects, both source server 132a, 132b, . . . 132n and target server 130 are not necessarily connected directly to the network 150, nor connected directly or indirectly at the same instant in time. That is to say that the implied data transfer via the network 150 can happen asynchronously. For instance, there may be an intermediary server implied in the network 150, which can temporarily store source data from the plurality of source servers 132, for a period of time, until the target server 130 makes connection to the network 150.

The network 150 can include, for example, any one or more of a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like. The network 150 may be wired or wireless, as mentioned hereinbelow. Furthermore, in certain aspects, the network 150 may consist of intermediary servers and data stores, such that temporary parking of data can occur to facilitate asynchronous timing of connection to the network 150 of the source servers 132 and the target server 130. In other aspects, the network 150 can be represented by a transportable medium such as, for example, a portable USB storage drive or the like.

Example System for Storing and Retrieving Data in Data Stores

FIG. 2 is a block diagram illustrating a system 200 including the example target server 130 and the example source server 132a shown in the architecture 100 of FIG. 1 according to certain aspects of the disclosure.

In this example system 200, the target server 130 and the source server 132a are connected over the network 150 via respective communications modules 214, 216. The communications modules 214, 216 are configured to interface with the network 150 to transmit and receive information, such as data, requests, responses, and commands to other devices on the network 150. The communications modules 214, 216 can be, for example, modems or Ethernet cards, and/or other suitable communications hardware/software.

The target server 130 includes a processor 218, the communications module 214, and a memory 220 that includes the target data store 210, which includes a target fact table 222. The processor 218 of the target server 130 is configured to execute instructions, such as instructions physically coded into the processor 218, instructions received from software in memory 220, instructions delivered from a remote memory, or a combination thereof. For example, the processor 218 of the target server 130 executes instructions to create a target data definition 312 (see FIG. 3A) for the target fact table 222 in the target data store 210. In certain aspects, the target data definition 312 includes at least one target attribute 328 and an aggregate attribute 336 (see FIG. 3A). In certain aspects, the at least one target attribute 328 and the aggregate attribute 336 represent a target record 330 (see FIG. 3A) of the target fact table 222. The processor 218 of the target server 130 also executes instructions to determine a source data definition 316 (see FIG. 3A) of the source table 228 in the source data store 212. In certain aspects, the source data definition 316 includes source attributes 324 (see FIG. 3A).

In certain aspects, data in the source table 228 can be dynamic. For example, data in the source table 228 can change without coordination between the source server 132a and the target server 130 such that the source attributes 324 can be changed to add or drop attributes, a column can be dropped, a new column can be added, a column name can be changed, and other data changes can occur, to name a few non-limiting examples.

The processor 218 of the target server 130 also executes instructions to receive at least one source record 318 (see FIG. 3A) of the source table 228. In certain aspects, the at least one source record 318 includes the source attributes 324. The processor 218 of the target server 130 also executes instructions to, in response to determining the source attributes 324 of the at least one source record 318 include at least one source attribute 326 (see FIG. 3A) that corresponds to the at least one target attribute 328, map the at least one source attribute 326 to the at least one target attribute 328 of the target record 330. The at least one source attribute 326 corresponds with respect to the schema of the target fact table 222. The processor 218 of the target server 130 also executes instructions to, in response to determining the source attributes 324 include at least one unmapped source attribute 334 (see FIG. 3A) that does not correspond to the at least one target attribute 328, process the at least one unmapped source attribute 334 into an unmapped attributes store 335 of the aggregate attribute 336 of the target record 330. The at least one unmapped source attribute 334 is schema-less with respect to the target fact table 222.

The processor 218 of the target server 130 also executes instructions to receive at least one updated source record 340 (see FIG. 3B) associated with the at least one source record 318. In certain aspects, the at least one updated source record 340 includes updated source data 344 and updated unmapped source data 346 (see FIG. 3B).

The processor 218 of the target server 130 also executes instructions to update the target record 330 corresponding to the at least one updated source record 340 that includes the updated source data 344 and the updated unmapped source data 346. In such aspects, the processor 218 of the target server 130 also executes instructions to read at least one attribute from the target record 330, as historical data 350, into a historical log 354 (see FIG. 3C); extract the at least one target attribute 328 corresponding to the updated source data 344; append the at least one target attribute 328 with the updated source data 344; and store the historical log 354 in the aggregate attribute 336. In certain aspects, the historical log 354 includes point-in-time attributes and the at least one unmapped source data 346 in the aggregate attribute 336 includes active value attributes.

In certain aspects, the processor 218 of the target server 130 also executes instructions to parse the at least one unmapped source attribute 334 in the aggregate attribute 336. In certain aspects, the at least one unmapped source attribute 334 is compressed in the aggregate attribute 336. In certain aspects, the at least one unmapped attribute 334 compressed in the aggregate attribute 336 is queryable by the processor 218. In certain aspects, the processor 218 of the target server 130 also executes instructions to, in response to a data query of the target fact table 222, retrieve data from one of the at least one target attribute 328 and the aggregate attribute 336 via a structured query language. In certain aspects, the data that is retrieved is lossless. In certain aspects, the processor 218 of the target server 130 also executes instructions to request, from the source server 132a, the at least one source record 318, the at least one updated source record 340, the updated source data 344, the updated unmapped source data 346, and any combination thereof including individually.

Figure 4A:
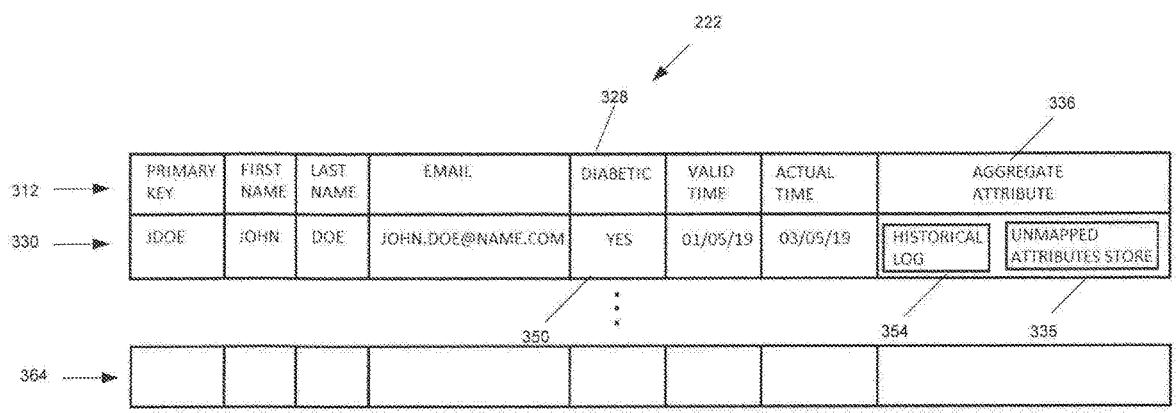
FIG. 4A illustrates an example target fact table associated with the example processes of FIGS. 3A-3C.
Figure 4B:
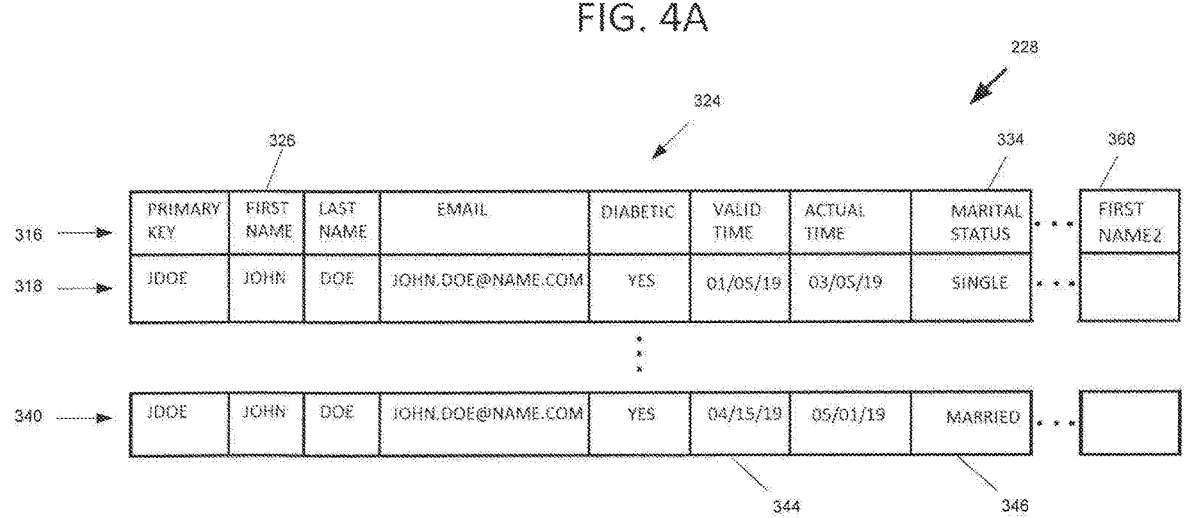
FIG. 4B illustrates an example source table associated with the example processes of FIGS. 3A-3C.

In certain aspects, after the processor 218 of the target server 130 has created the target data definition 312 based on the determination of the source data definition 316, the processor 218 can execute instructions to receive notifications from the source server 132a that the source server 132a, without coordination from the target server 130, changed data (such as, for example, the source attributes 324 of the source data definition 316) in the source table 228. In such aspects, after the processor 218 of the target server 130 receives such notifications, the processor 218 can execute instructions to update the target data definition 316 for the target fact table 222 based on the changed data in a source holder attribute 368 (see FIG. 4B) received, from the source table 228 on the source server 132a, at the unmapped attributes store 335.

The source server 132a includes a processor 224, the communications module 216, and a memory 226 that includes the source data store 212, which includes a source table 228. The processor 224 of the source server 132a is configured to execute instructions, such as instructions physically coded into the processor 224, instructions received from software in memory 226, instructions delivered from a remote memory, or a combination thereof. For example, the processor 224 of the source server 132a executes instructions to transmit the at least one source record 318, the at least one updated source record 340, the updated source data 344, the updated unmapped source data 346, and any combination thereof including individually. In certain aspects, the processor 224 of the source server 132a is configured to execute instructions to change data (i.e., the source attributes 324 of the source data definition 316) in the source table 228, without coordination from the target server 130, and to optionally communicate these data changes, stored in the source holder attribute 368, to the target server 130 at a later time.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of steps of the method(s).

Figure 3A:
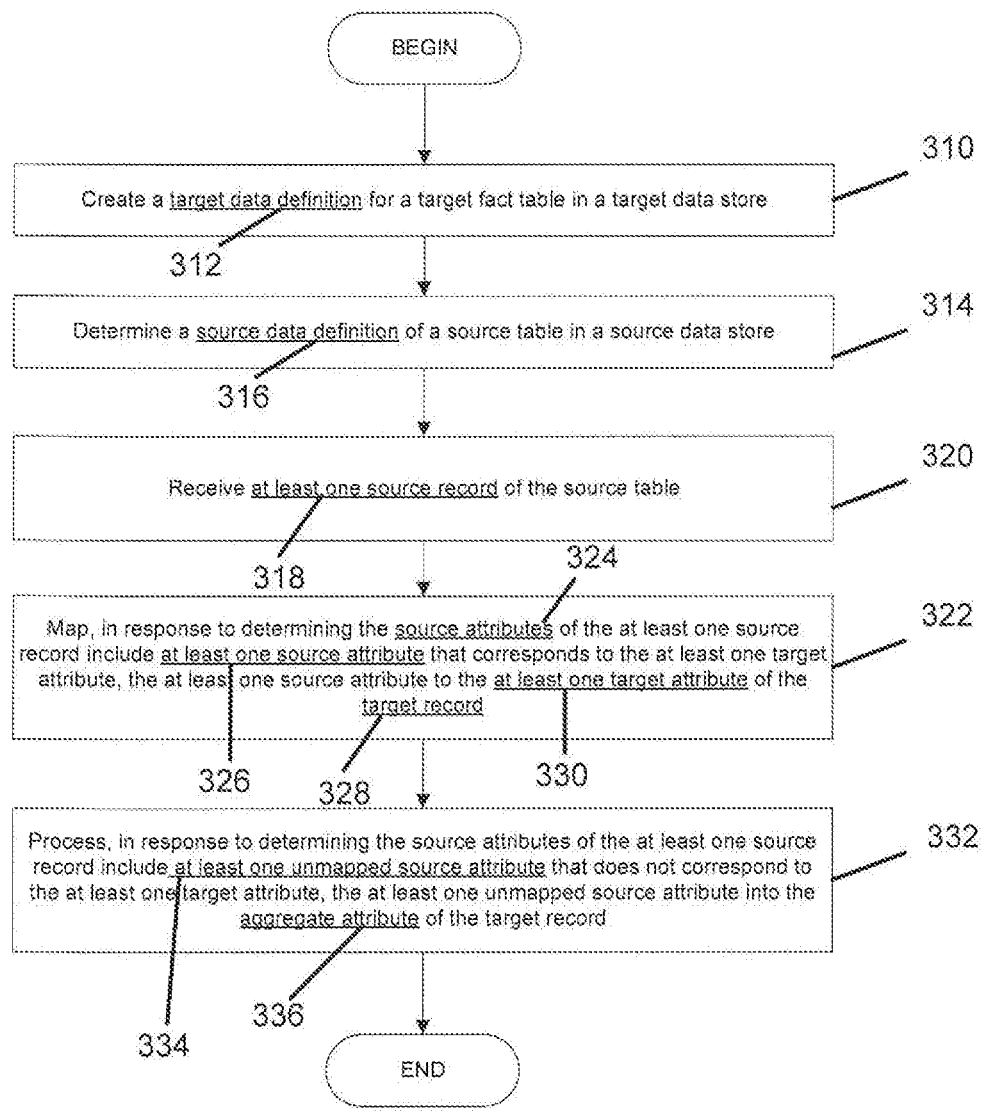
FIG. 3A illustrates an example process for populating data into a data store using the example servers of FIGS. 2 and 3.

FIG. 3A illustrates an example process 300A for populating data that is received from the source table 228 in the source data store 212 into the target fact table 222 of the target data store 220 using the example target server 130 and source server 132a of the system 200 of FIG. 2. While FIG. 3A is described with reference to the example system 200 of FIG. 2, it should be noted that the process steps of FIG. 3A may be performed by other systems having more or fewer components as compared with the system 200 of FIG. 2.

The process 300A begins by proceeding to step 310 when the target server 130 creates a target data definition 312 for the target fact table 222 in the target data store 210. At step 314, the target server 130 determines a source data definition 316 of the source table 228 in the source data store 212. The target server 130 receives at least one source record 318 of the source table 228 from the source server 132a, as illustrated at step 320. At step 322, in response to determining the source attributes 324 of the at least one source record 318 include at least one source attribute 326 that corresponds to the at least one target attribute 328, the target server 130 maps the at least one source attribute 326 to the at least one target attribute 328 of the target record 330. At step 332, the target server 130, in response to determining the source attributes 324 of the at least one source record 318 include at least one unmapped source attribute 334 that does not correspond to the at least one target attribute 328, processes the at least one unmapped source attribute 334 into the unmapped attributes store 335 of the aggregate attribute 336 of the target record 330.

Figure 3B:
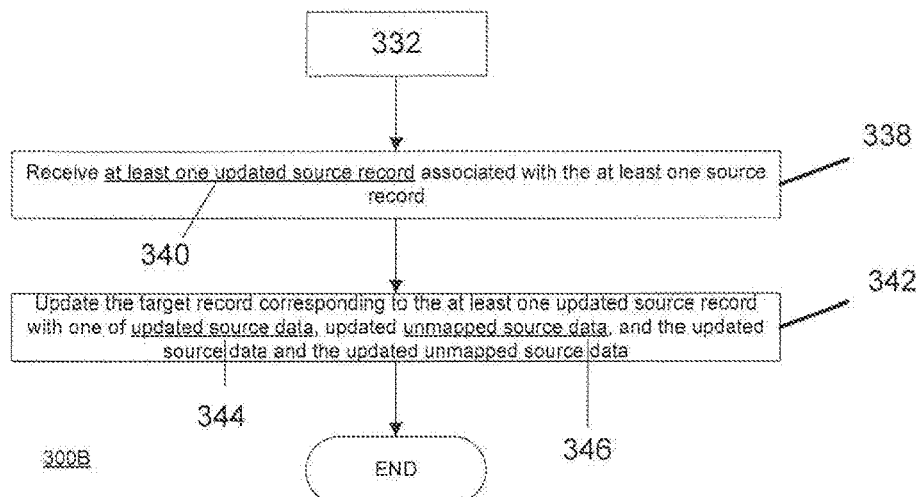
FIG. 3B illustrates an example process for updating the data store using the example servers of FIGS. 2 and 3.

FIG. 3B illustrates an example process 300B, which can continue from step 332 in FIG. 3A, for updating the target record 330 using the example target server 130 and source server 132a of the system 200 of FIG. 2. While FIG. 3B is described with reference to the example system 200 of FIG. 2, it should be noted that the process steps of FIG. 3B may be performed by other systems having more or fewer components as compared with the system 200 of FIG. 2.

The process 300B begins by proceeding to step 338 when the target server 130 receives at least one updated source record 340 associated with the at least one source record 318. At step 342, the target server 130 updates the target record 330 corresponding to the at least one updated source record 318 with the updated source data 344 and the updated unmapped source data 346.

Figure 3C:
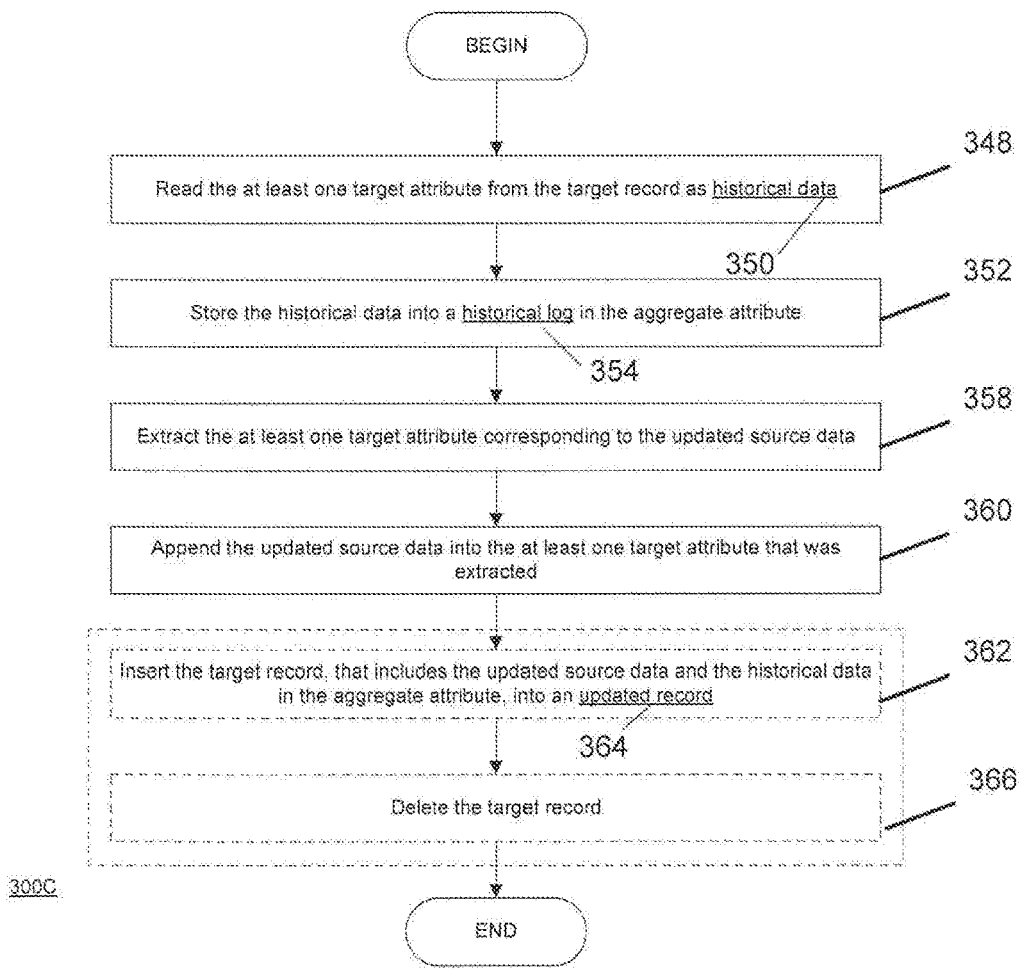
FIG. 3C illustrates an example process detailing the updating process of the data store of FIG. 3B using the example servers of FIGS. 2 and 3.

FIG. 3C illustrates an example process detailing the updating process of step 342 in FIG. 3B, for updating the target record 330 using the example target server 130 and source server 132a of the system 200 of FIG. 2. While FIG. 3B is described with reference to the example system 200 of FIG. 2, it should be noted that the process steps of FIG. 3C may be performed by other systems having more or fewer components as compared with the system 200 of FIG. 2.

The process 300C begins by proceeding to step 348 when the target server 130 reads the at least one target attribute 328 from the target record 330 as historical data 350. At step 352, the target server 130 stores the historical data 350 into a historical log 354 in the aggregate attribute 336. The target server 130 extracts the at least one target attribute 328 corresponding to the updated source data 356, as illustrated at step 358. At step 360, the target server 130 appends the updated source data 356 into the at least one target attribute 328 that was extracted. Optionally, in certain aspects, as illustrated in phantom at step 362, the target server 130 inserts the target record 330, that includes the updated source data 356 and the historical data 350 in the aggregate attribute 336, into an updated record 364 of the target fact table 222. In such aspects, as illustrated in phantom at step 366, the target server 130 then deletes the original target record 330. This allows the most updated version of a target record 330 (i.e., the updated record 364) to be stored physically near other updates, as the target server 130 can be optionally configured to store record data in such a manner.

FIGS. 3A-3C set forth example processes for storing and retrieving data in data stores using the example target server 130 and source server 132a of FIG. 2. An example will now be described using the target fact table 222 and the source table 228 illustrated in FIG. 4A and FIG. 4B, respectively, with respect to the example processes 300A, 300B, 330C of FIGS. 3A-3C.

For example, the target data definition 312 of the target fact table 222 is created to include the at least one target attribute 328 and the aggregate attribute 336. Although in this example the at least one target attribute 328 includes the target attributes of primary key, first name, last name, email, diabetic, valid time, and actual time, it should be understood that any number of target attributes can be created. The aggregate attribute 336 is configured to store change history of the target record 330 into the historical log 354. The aggregate attribute 336 is also configured to store unmapped source attributes, such as the at least one unmapped source attribute 334, into the unmapped attributes store 335.

The target server 130 can determine the source data definition 316 of the source table 228 and, in particular, determine the source attributes 324 of the source table 228. Although in this example the source attributes 324 include the at least one source attribute 326 of primary key, first name, last name, email, diabetic, valid time, actual time, and the at least one unmapped source attribute 334 of marital status, it should be understood that any number of source attributes can be included. In this example, the target server 130 receives the at least one source record 318 of the source table 228 from the source server 132a and determines that the source attributes 324 includes the at least one source attribute 326 that corresponds to the at least one target attribute 328. In response to this determination, the target server 130 maps the at least one source attribute 326 to the at least one target attribute 328 in the target record 330. Moreover, the target server 130 also determines that the source attributes 324 also includes at least one unmapped source attribute 334 (i.e., marital status) that does not correspond to the at least one target attribute 328. In response to this determination, the target server 130 processes the at least one unmapped source attribute 334 into the unmapped attributes store 335 stored in the aggregate attribute 336.

Further, in an update process, the target server 130 can receive, from the source server 132a, the at least one updated source record 340 associated with the at least one source record 318. As can be seen, the valid time, the actual time, and the marital status source attributes are changed in this example. The target server 130 then updates the target record 330 with the updated source data 344 (i.e., the valid time of 04/15/19 and the actual time of 05/01/19) and the updated unmapped source data 346 (i.e., the marital status of married). In certain aspects, the updating process includes the target server 130 reading the at least one target attribute 328 from the target record 330 as historical data 350; storing the historical data 350 into the historical log 354 stored in the aggregate attribute 336; extracting the at least one target attribute 328 corresponding to the updated source data 344 (i.e., the valid time of 01/05/19 and the actual time of 03/05/19); and appending the updated source data 344 into the at least one target attribute that was extracted. Optionally, in certain other aspects, the target server 130 further inserts the target record 330, that includes the updated source data 344 and the historical data 350 in the aggregate attribute 336, into an updated record 364 and then deletes the target record 330. By doing so, specific target attributes, such as the at least one target attribute 328, that are time ordered (i.e., by date, by time, etc.) can be arranged in physical proximity with respect to each other, which can add further benefits to improving data store performance.

Further, the source server 132a can, without coordination or communication with the target server 130, change data in the source table 228 such as, for example, dropping the at least one source attribute 326. The at least one source attribute 326 that is dropped can be replaced by the source holder attribute 368. At a later time, the source server 132 can notify the target server 130 that this change data has occurred and transmit the source holder attribute 368, which is unmapped, to the unmapped attributes store 335. The target server 130 can then update and backfill the at least one source attribute 326 that was dropped with the source holder attribute 368.

In this manner, the described systems and methods allow for asynchronous or delayed schema migration without requiring real-time coordination between the source server 132a and the target server 130 at the time of data change in the source table 228. Such a delayed schema migration strategy can improve systems which the source data does not have a responsible schema migration strategy or in systems which do not coordinate or communicate between the source data definition 316 and the target data definition 312. For example, in systems that do not have a responsible schema migration strategy, the target might enter into a broken state when the source drops a column because there is no data schema coordination between the target and the source.

Hardware Overview

Figure 5:
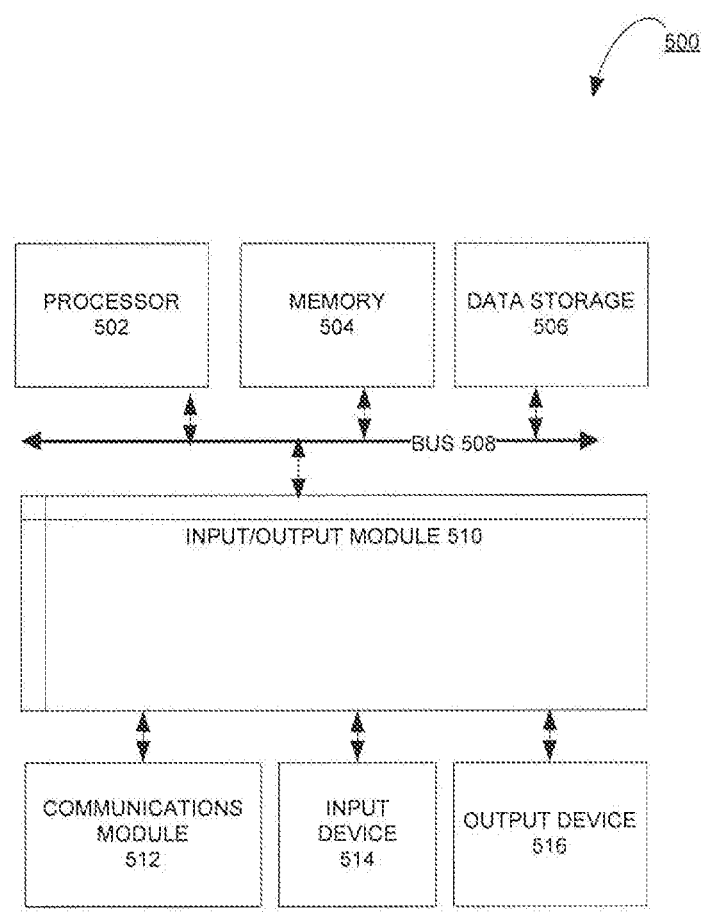
FIG. 5 is a block diagram illustrating an example computer system with which the example servers of FIGS. 1 and 2 can be implemented.

FIG. 5 is a block diagram illustrating an example computer system 500 with which the target server 130 and the source servers 132a, 132b, . . . 132n of FIG. 2 can be implemented. In certain aspects, the computer system 500 may be implemented using hardware or a combination of software and hardware, either in a dedicated server, integrated into another computing component, or distributed across multiple computing components.

Computer system 500 (e.g., the target server 130 and the source servers 132a, 132b, . . . 132n) may include a bus 508 and/or another suitable communication mechanism for communicating information, and one or more processors 502 (e.g., processors 218, 224) coupled with the bus 508 for processing information. According to one aspect, the computer system 500 can be a cloud computing server of an IaaS that is able to support PaaS and SaaS services. According to an example embodiment, the computer system 500 is implemented as one or more special-purpose computing devices. The special-purpose computing device may be hard-wired to perform the disclosed techniques, and/or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination thereof. Such special-purpose computing devices may also combine custom hard-wired logic, ASICs, or FPGAs with custom programming to accomplish the techniques contemplated herein throughout. The special-purpose computing devices may be desktop computer systems, portable computer systems, handheld devices, networking devices, and/or any other device that incorporates hard-wired and/or program logic to implement the techniques. By way of example, the computer system 500 may be implemented with the one or more processors 502. The one or more processors 502 may comprise a general-purpose microprocessor, a microcontroller, a Digital Signal Processor (DSP), an ASIC, a FPGA, a Programmable Logic Device (PLD), a controller, a state machine, gated logic, discrete hardware components, or any other suitable entity that can perform calculations or other manipulations of information.

The computer system 500 may include, in addition to hardware, code that creates an execution environment for the computer program in question, e.g., code that constitutes processor firmware, a protocol stack, a data store management system, an operating system, or a combination of one or more of them stored in an included memory 504 (e.g., memory 220, 226), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, and/or any other suitable storage device of combination of storage devices, coupled to the bus 508 for storing information and instructions to be executed by the one or more processors 502. The processor(s) 502 and the memory 504 can be supplemented by, or incorporated in, special purpose logic circuitry. Expansion memory may also be provided and connected to computer system 500 through input/output module 510, which may include, for example, a SIMM (Single In Line Memory Module) card interface. Such expansion memory may provide extra storage space for computer system 500, or may also store applications or other information for computer system 500. Specifically, expansion memory may include instructions to carry out or supplement the processes described above, and may further include secure information. Thus, for example, expansion memory may be provided as a security module for computer system 500, and may be programmed with instructions that permit secure use of computer system 500. In addition, secure applications may be provided via the SIMM cards, along with additional information, such as placing identifying information on the SIMM card in a non-hackable manner.

The instructions may be stored in the memory 504 and implemented in one or more computer program products, e.g., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). The memory 504 may also be used for storing temporary variables or other intermediate information during execution of instructions to be executed by the processor(s) 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Example input/output modules 510 include data ports such as USB ports. In addition, input/output module 510 may be provided in communication with the processor(s) 502, so as to enable near area communication of computer system 500 with other devices. The input/output module 510 may provide, for example, for wired communication in some implementations, or for wireless communication in other implementations, and multiple interfaces may also be used. The input/output module 510 is configured to connect to a communications module 512. The communications modules 512 (e.g., communications modules 214, 226) may comprise networking interface cards, such as Ethernet cards and/or modems.

The components of the system can be interconnected by any form or medium of digital data communication, e.g., a communication network. The communication network (e.g., the network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

For example, in certain aspects, the communications module 512 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time division multiple access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, the communications module 512 sends and receives electrical, electromagnetic or optical signals that carry digital data streams representing various types of information. The network link typically provides data communication through one or more networks to other data devices. For example, the network link of the communications module 512 may provide a connection through local network to a host computer or to data equipment operated by an Internet Service Provider (ISP). The ISP in turn provides data communication services through the world wide packet data communication network now commonly referred to as the "Internet". The local network and Internet both use electrical, electromagnetic or optical signals that carry digital data streams. The signals through the various networks and the signals on the network link and through the communications module 512, which carry the digital data to and from the computer system 500, are example forms of transmission media.

The computer system 500 can send messages and receive data, including program code, through the network(s), the network link and communications module 512. In the Internet example, a server might transmit a requested code for an application program through the Internet, the ISP, the local network, and the communications module 512. The received code may be executed by the processor(s) 502 as it is received, and/or stored in the data storage device 506 for later execution.

In certain aspects, the input/output module 510 is configured to connect to a plurality of devices, such as an input device 514 and/or an output device 516. Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device.

According to one aspect of the present disclosure, the target server 130 and the source servers 132a, 132b, . . . 132n can be implemented using the computer system 500 in response to the processor(s) 502 executing one or more sequences of one or more instructions contained in the memory 504. Such instructions may be read into the memory 504 from another machine-readable medium, such as the data storage device 506. Execution of the sequences of instructions contained in the memory 504 causes the processor(s) 502 to perform the process steps described herein. One or more processors in a multi-processing arrangement may also be employed to execute the sequences of instructions contained in the memory 504. The processor(s) 502 may process the executable instructions and/or data structures by remotely accessing the computer program product, for example by downloading the executable instructions and/or data structures from a remote server through the communications module 512 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects a user of systems and methods as disclosed herein may perform at least some of the steps by accessing a cloud server through a network connection. Further, data files, circuit diagrams, performance specifications and the like resulting from the disclosure may be stored in a data store server in the cloud-computing environment, or may be downloaded to a private storage device from the cloud-computing environment.

As mentioned hereinabove, the computing system 500 may include clients and servers. A client and server are generally remote from each other and typically interact through a communication network. The relationship of client and server arises by virtue of computer programs running on the respective computers and having a client-server relationship to each other. The computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to the processor(s) 502 for execution. The term "storage medium" as used herein refers to any non-transitory media that store data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as the data storage device 506. Volatile media include dynamic memory, such as the memory 504. Transmission media include coaxial cables, copper wire, and fiber optics, including the wires that include the bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire and fiber optics, including the wires that include bus 508. Transmission media can also take the form of acoustic or light waves, such as those generated during radio-wave and infra-red data communications. Furthermore, as used in this specification of this application, the terms "computer", "server", "processor", and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for".

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter. The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method for improving data store performance, the computer-implemented method comprising:

creating a target data definition for a target fact table in a target data store, the target data definition comprising at least one target attribute and an aggregate attribute, the at least one target attribute and the aggregate attribute representing a target record of the target fact table;

determining a source data definition of a source table in a source data store, the source data definition comprising a source attribute;

receiving at least one source record of the source table, the at least one source record comprising the source attributes;

mapping, in response to determining the source attribute of the at least one source record include at least one source attribute that corresponds to the at least one target attribute, the at least one source attribute to the at least one target attribute of the target record; and processing, in response to determining the source attribute of the at least one source record include at least one unmapped source attribute that does not correspond to the at least one target attribute, the at least one unmapped source attribute into an unmapped attributes store of the aggregate attribute of the target record;

receiving at least one updated source record associated with the at least one source record, the at least one updated source record comprising one of an updated source data, updated unmapped source data, and both the updated source record and the updated unmapped source data;

updating the target record corresponding to the updated source record with one of the updated source data, the updated unmapped source data, and both the updated source data and the updated unmapped source data;

reading the at least one target attribute from the target record as historical data;

storing the historical data into a historical log in the aggregate attribute;

extracting the at least one target attribute corresponding to the updated source data; and appending the updated source data into the at least one target attribute.

2. The computer-implemented method of claim 1, wherein processing the at least one unmapped source attribute into the aggregate attribute comprises parsing the at least one unmapped source attribute in the aggregate attribute.

3. The computer-implemented method of claim 2, wherein the at least one unmapped source attribute is compressed in the aggregate attribute.

4. The computer-implemented method of claim 3, wherein the at least one unmapped source attribute compressed in the aggregate attribute is queryable.

5. The computer-implemented method claim 1, further comprising inserting the target record, appended with the updated source data and the historical data in the aggregate attribute, into an updated record; and deleting the target record.

6. The computer-implemented method claim 1, wherein the historical log comprises point-in-time attributes and the at least one unmapped source attribute in the aggregate attribute comprises active value attributes.

7. The computer-implemented method of claim 1, further comprising retrieving, in response to a data query of the target fact table, data from one of the at least one target attribute and the aggregate attribute via a structured query language.

8. The computer-implemented method of claim 1, further comprising updating the target data definition for the target fact table based on a source holder attribute received, from the source table, at the unmapped attributes store.

9. A system for improving data store performance, comprising:

a memory comprising instructions; and one or more processors configured to execute the instructions to:

create, at a target server, a target data definition for a target fact table in a target data store, the target data definition comprising at least one target attribute and an aggregate attribute, the at least one target attribute and the aggregate attribute representing a target record of the target fact table;

determine, at the target server, a source data definition of a source table in a source data store, the source data definition comprising a source attribute;

receive, at the target server from a source server, at least one source record of the source table, the at least one source record comprising the source attribute;

map, by the target server in response to determining the source attribute of the at least one source record include at least one source attribute that corresponds to the at least one target attribute, the at least one source attribute to the at least one target attribute of the target record; and process, by the target server in response to determining the source attribute of the at least one source record include at least one unmapped source attribute that does not correspond to the at least one target attribute, the at least one unmapped source attribute into an unmapped attributes store of the aggregate attribute of the target record;

receive, at the target server, at least one updated source record associated with the at least one source record, the at least one updated source record comprising one of an updated source data, updated unmapped source data, and both the updated source data and the updated unmapped source data;

update, at the target server, the target record corresponding to the at least one updated source record with one of the updated source data, the updated unmapped source data, and both the updated source data and the updated unmapped source data, wherein the instruction to update the target record comprises instructions to:

read the at least one target attribute from the target record as historical data;

store the historical data into a historical log in the aggregate attribute;

extract the at least one target attribute corresponding to the updated source data; and append the updated source data into the at least one target attribute.

10. The system of claim 9, wherein the one or more processors is further configured to execute the instructions to:

parse, at the target server, the at least one unmapped source attribute in the aggregate attribute.

11. The system of claim 10, wherein the at least one unmapped source attribute is compressed in the aggregate attribute.

12. The system of claim 11, wherein the at least one unmapped source attribute compressed in the aggregate attribute is queryable.

13. The system of claim 9, wherein the historical log comprises point-in-time attributes and the at least one unmapped source attribute in the aggregate attribute comprises active value attributes.

14. The system of claim 9, wherein the one or more processors is further configured to execute the instructions to retrieve, in response to a data query of the target fact table, data from one of the at least one target attribute and the aggregate attribute via a structured query language.

15. The system of claim 14, wherein the data that is retrieved is lossless.

16. A non-transitory machine-readable storage medium comprising machine-readable instructions for causing one or more processors to execute a method for improving data store performance, the method comprising:

creating, at a target server, a target data definition for a target fact table in a target data store on the target server, the target data definition comprising at least one target attribute and an aggregate attribute, the at least one target attribute and the aggregate attribute representing a target record of the target fact table;

determining, at the target server, a source data definition of a source table in a source data store, the source data definition comprising a source attribute;

receiving, at the target server from a source server, at least one source record of the source table on the source server, the at least one source record comprising the source attributes;

mapping, by the target server in response to determining the source attribute of the at least one source record include at least one source attribute that corresponds to the at least one target attribute, the at least one source attribute to the at least one target attribute of the target record;

processing, by the target server in response to determining the source attribute of the at least one source record include at least one unmapped source attribute that does not correspond to the at least one target attribute, the at least one unmapped source attribute into an unmapped attributes store of the aggregate attribute of the target record;

receiving at least one updated source record associated with the at least one source record, the at least one updated source record comprising one of an updated source data, updated unmapped source data, and both the updated source data and the updated unmapped source data;

updating the target record corresponding to the at least one updated source record with one of the updated source data, the updated unmapped source data, and both the updated source data and the updated unmapped source data;

reading the at least one target attribute from the target record as historical data;

storing the historical data into a historical log in the aggregate attribute;

extracting the at least one target attribute corresponding to the updated source data; and appending the updated source data into the at least one target attribute.

17. The non-transitory machine-readable storage medium of claim 16, wherein the method further comprises retrieving, in response to a data query of the target fact table, data from one of the at least one target attribute and the aggregate attribute via a structured query language.

* * * * *